United States Patent [19]
Tapper

[11] Patent Number: 5,909,687

[45] Date of Patent: Jun. 1, 1999

[54] AUTOMATED BUSINESS CARD LOCATOR

[76] Inventor: Douglas S. Tapper, 1632 Oakwood Ct., NE., Marietta, Ga. 30066

[21] Appl. No.: 08/888,334

[22] Filed: Jul. 3, 1997

[51] Int. Cl.[6] .................................................... G06F 17/30
[52] U.S. Cl. .............................................. 707/104; 707/2
[58] Field of Search ........................................ 707/2, 104

[56] References Cited

U.S. PATENT DOCUMENTS

| | | | |
|---|---|---|---|
| 3,917,317 | 11/1975 | Ryan | 283/42 |
| 4,669,754 | 6/1987 | Lalonde | 283/67 |
| 4,750,281 | 6/1988 | Magdovitz | 40/124.2 |
| 4,832,372 | 5/1989 | Young | 281/31 |
| 4,907,904 | 3/1990 | Baldwin | 402/80 R |
| 4,974,983 | 12/1990 | Givati | 402/80 R |
| 5,234,277 | 8/1993 | Le | 402/79 |
| 5,237,651 | 8/1993 | Randall | 345/350 |
| 5,282,690 | 2/1994 | Moseley | 402/79 |
| 5,283,864 | 2/1994 | Knowlton | 345/350 |
| 5,320,275 | 6/1994 | Williams | 206/425 |
| 5,393,157 | 2/1995 | Basmajian | 402/79 |
| 5,429,228 | 7/1995 | Dahl | 206/755 |
| 5,446,882 | 8/1995 | Capps et al. | 707/104 |
| 5,515,497 | 5/1996 | Itri et al. | 345/340 |
| 5,590,911 | 1/1997 | Wilson | 283/36 |
| 5,600,827 | 2/1997 | Nakabayashi et al. | 707/2 |
| 5,601,681 | 2/1997 | Bayro | 156/268 |
| 5,634,668 | 6/1997 | Barreiro, Jr. | 28/33 |

Primary Examiner—Wayne Amsbury
Assistant Examiner—Shahid Alam
Attorney, Agent, or Firm—Randy W. Lacasse

[57] ABSTRACT

An automated business card locator comprises two components: 1) a software program that creates an index making the cards easy to locate, and 2) a loose-leaf binder which retains clear plastic business cardholder sheets and index sheet protectors. Business card information is entered, by template, into the software program, sorted, printed and retained within the loose-leaf binder.

10 Claims, 3 Drawing Sheets

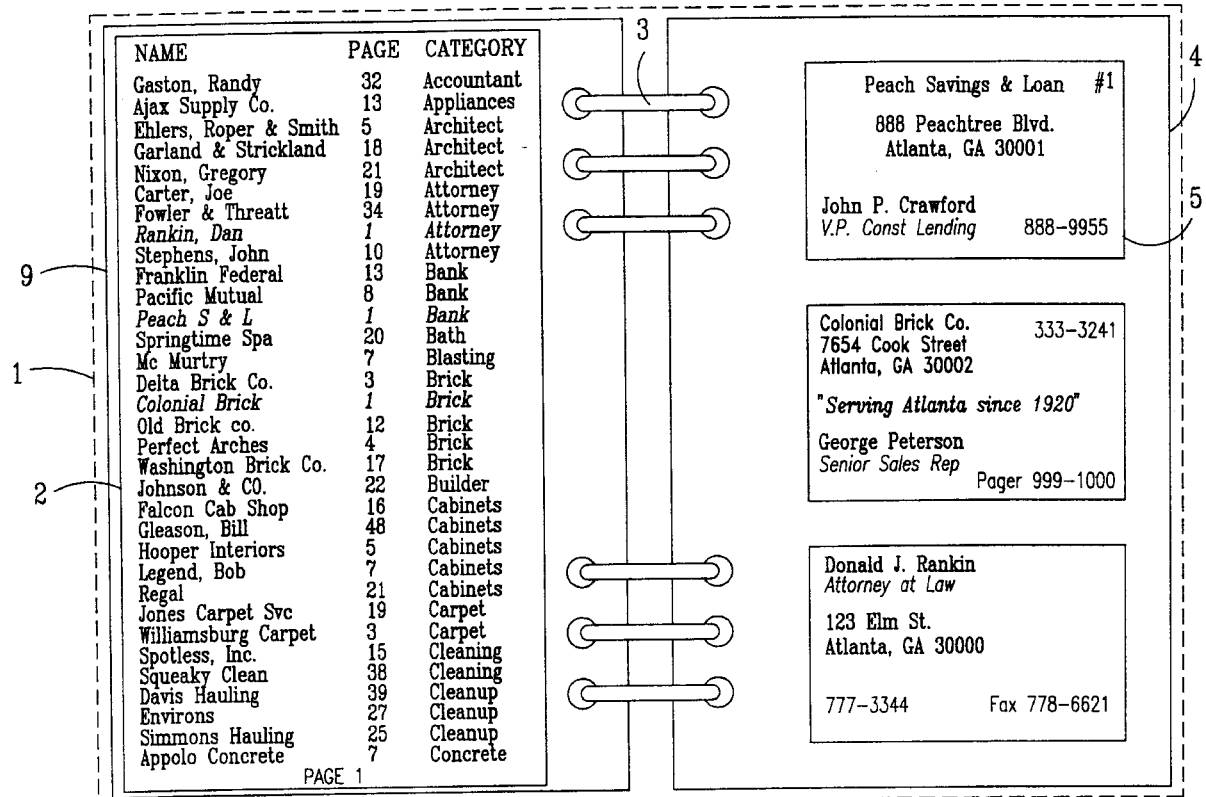

FIG. 1

| NAME | PAGE | CATEGORY |
|---|---|---|
| Gaston, Randy | 32 | Accountant |
| Ajax Supply Co. | 13 | Appliances |
| Ehlers, Roper & Smith | 5 | Architect |
| Garland & Strickland | 18 | Architect |
| Nixon, Gregory | 21 | Architect |
| Carter, Joe | 19 | Attorney |
| Fowler & Threatt | 34 | Attorney |
| *Rankin, Dan* | *1* | *Attorney* |
| Stephens, John | 10 | Attorney |
| Franklin Federal | 13 | Bank |
| Pacific Mutual | 8 | Bank |
| *Peach S & L* | *1* | *Bank* |
| Springtime Spa | 20 | Bath |
| Mc Murtry | 7 | Blasting |
| Delta Brick Co. | 3 | Brick |
| *Colonial Brick* | *1* | *Brick* |
| Old Brick co. | 12 | Brick |
| Perfect Arches | 4 | Brick |
| Washington Brick Co. | 17 | Brick |
| Johnson & CO. | 22 | Builder |
| Falcon Cab Shop | 16 | Cabinets |
| Gleason, Bill | 48 | Cabinets |
| Hooper Interiors | 5 | Cabinets |
| Legend, Bob | 7 | Cabinets |
| Regal | 21 | Cabinets |
| Jones Carpet Svc | 19 | Carpet |
| Williamsburg Carpet | 3 | Carpet |
| Spotless, Inc. | 15 | Cleaning |
| Squeaky Clean | 38 | Cleaning |
| Davis Hauling | 39 | Cleanup |
| Environs | 27 | Cleanup |
| Simmons Hauling | 25 | Cleanup |
| Appolo Concrete | 7 | Concrete |

PAGE 1

Peach Savings & Loan    #1
888 Peachtree Blvd.
Atlanta, GA 30001

John P. Crawford
V.P. Const Lending     888-9955

Colonial Brick Co.    333-3241
7654 Cook Street
Atlanta, GA 30002
"Serving Atlanta since 1920"
George Peterson
Senior Sales Rep    Pager 999-1000

Donald J. Rankin
Attorney at Law
123 Elm St.
Atlanta, GA 30000

777-3344    Fax 778-6621

FIG. 2

Adding a PC Card Record

Name:       [6]
Page:       [7]
Category: [8]

FIG. 3

| Printout by CATEGORY | | |
|---|---|---|
| NAME | PAGE | CATEGORY |
| Sinclair, Marjorie | 18 | Accountant |
| TACS/Georgia | 16 | Accountant |
| Henderson Advertising | 39 | Advertising |
| Howard Payne Company | 32 | Appliances |
| Lake City | 44 | Appliances |
| Sears Retail Outlet | 23 | Appliances |
| Gimson Kirkland | 31 | Architect |
| Mix, Greg | 27 | Architect |
| A Step Beyond | 13 | Art |
| Chalker & Chalker | 33 | Attorney |
| Fowler, Joe | 27 | Attorney |
| Ganek & Wright | 15 | Attorney |
| Ganz, Chuck | 41 | Attorney |
| Woods, Kyle | 24 | Attorney |
| Brake Fast | 23 | Auto |
| Good Year | 7 | Auto |
| Jiffy Lube | 26 | Auto |
| Regal Auto Wash | 17 | Auto |
| Bank of Canton | 33 | Bank |
| Bank of North Georgia | 17 | Bank |
| Credit Union Service Ctr | 8 | Bank |
| First Nat Bk-Cherokee | 12 | Bank |
| Heritage Bank – Updegraff | 21 | Bank |
| IBM Southeast | 2 | Bank |
| The Chattahoochee Bank | 40 | Bank |
| Trust Company | 6 | Bank |
| Atlanta Structural Products | 21 | Beams |
| Chateaux D'Elegance | 15 | Builder |
| Bailey's Cabinet Shop | 30 | Cabinet |
| U.S. Customized Finishes | 6 | Cabinet Doors |
| Brock, Kenneth | 34 | Cabinets |
| Canac | 38 | Cabinets |
| Legerge, Bob | 18 | Cabinets |

Page 1

| Printout by NAME | | |
|---|---|---|
| NAME | PAGE | CATEGORY |
| A Step Beyond | 13 | Art |
| A-Z Home Inspections | 7 | Home Inspection |
| Ace Sand Company | 8 | Sand |
| Ackerman & Co | 9 | REstate |
| All American Screens | 30 | Screens |
| ASAP Signs | 4 | Signs |
| AT&T Roofing | 20 | Roofer |
| Atlanta Carpet Co | 40 | Carpet |
| Atlanta Structural Products | 21 | Beams |
| Bailey's Cabinet Shop | 30 | Cabinet |
| Bank of Canton | 33 | Bank |
| Bank of North Georgia | 17 | Bank |
| Brake Fast | 23 | Auto |
| Brock, Kenneth | 34 | Cabinets |
| Buddha's Delight | 17 | Restaurant |
| C & C Fence Co | 24 | Fence |
| C & N Bobcat | 37 | Loader |
| C.P. Irrigation Co | 43 | Irrigation |
| Canac | 38 | Cabinets |
| Cannon Tile Company | 38 | Tile |
| Carol Schlitz | 10 | Legal |
| Cellular Warehouse | 26 | Cellular |
| Central Drywall | 41 | Drywall |
| Chalker & Chalker | 33 | Attorney |
| Chateaux D'Elegance | 15 | Builder |
| Chavez Masonry | 8 | Mason |
| Circuit City | 2 | Electronics |
| Coldwell Banker - Greer | 20 | REstate |
| Cole Gutter Service | 7 | Gutters |
| Color Tile | 32 | Tile |
| Credit Union Service Ctr | 8 | Bank |
| Customtop Corian | 30 | Countertops |
| Cyber-Tech | 1 | Computer |
| Page 1 | | |

FIG. 4

AUTOMATED BUSINESS CARD LOCATOR

BACKGROUND OF THE INVENTION

1. Field of Invention

The present invention relates generally to the field of business card holders. More specifically, the present invention is related to a combination software/folder business card organizer.

2. Discussion of Prior Art

Business card holders represent a general method of retaining and organizing a selected group of business cards. The difficulty with business card holders stems from the constant practice of updating the cards within the holder. Organizing by name requires a reordering of the cards each time an addition or removal from the current group is made. Likewise, organizing by subject requires leaving large sections of empty card slots in anticipation of adding future cards. Generally, the user abandons any organizational method and places the cards randomly within the holder. Each time a specific card is needed the user's find themselves scanning the cards in an attempt to locate cards. Electronic or computerized card organizers have made an effort to rectify this problem by entering card data by either typing all card information or scanning the card itself to retain essential information contained on the card. Once entered into electronic storage, the card information can be searched or otherwise organized. The electronic organizers fail, however, to provide a simple, inexpensive, portable business card holder which does not require entry of all card information and further retains the original card holder functionality.

The following prior art is representative of the various devices and methods described above. Each of them fail to provide for the combined software/card holder system of the present invention.

The patent to Làlonde (U.S. Pat. No. 4,669,754) provides for an agenda system comprising a plurality of index-tabbed sections in a book-like form within the cover.

The patent to Magdovitz (U.S. Pat. No. 4,750,281) provides for groups of cards with each card having first and second separable sections. Those sections having legible generic service information on the first section of each card, and specific service information on the second section of each card. The legible information on the cards in the same group being the same, and the legible information on the cards in different groups being different.

The patent to Young (U.S. Pat. No. 4,832,372) provides for a portfolio carrying a plurality of organized business cards. Pocket 200 retains magnetic disk 204 but appears limited to a general storing feature only, i.e., the disk does not interact with the cards.

The patent to Baldwin (U.S. Pat. No. 4,907,904) provides for a notebook with selectively changeable, recoverable and replaceable information carriers. The disclosed invention includes, within the book, supply information carriers in the form of pressure-sensitive adhesive coated removable labels, either blank or preferably preprinted, with typical diary information such as name, address and telephone numbers. The individual labels, after being initially filled in with information, may be replaced or rearranged as desired in the appropriately indexed portion of the book.

The patent to Givati (U.S. Pat. No. 4,974,983) provides for a card holder which comprises a binder, including a plurality of holder sheets, each formed with a plurality of transparent pockets for holding business cards, and a plurality of blank sheets interleaved between the holder sheets, such that when the binder is open to expose one of the holder sheets on one side of the open binder, a blank sheet is simultaneously exposed on the opposite side of the binder permitting entry of information thereon pertaining to the card held by the exposed holder sheet.

The patent to Le (U.S. Pat. No. 5,234,277) provides for a business card filing organization. The device includes a marking structure to indicate various categorizing of the business cards mounted within the structure.

The patent to Moseley (U.S. Pat. No. 5,282,690) provides for a foldable pull-out index card.

The patent to Capps et al. (U.S. Pat. No. 5,446,882) provides for an interface for a computerized database having card and list views. This reference is illustrative of a group of patents which include a portable computerized information organizer. These references fail to illustrate the physical card holder of the present invention. U.S. Pat. No. 5,600,827 represents an additional example of computerized business card information managers.

U.S. Pat. Nos. 5,320,275; 5,429,228; 5,590,911 and 5,601,681 illustrate additional background teachings to the present invention.

Whatever the precise merits, features and advantages of the above cited references, none of them achieve or fulfills the purposes of the present invention. Accordingly, it is an object of the present invention to provide for an organized business card holder It is an additional object of the present invention to combine computerized software with a physical business card holder.

It is an additional object of the present invention to enable organization of business cards held within a business card holder while allowing for random placement of the cards within.

These and other objects are achieved by the detailed description that follows.

SUMMARY OF THE INVENTION

The disclosed system improves on the prior art and eliminates many problems associated with the prior art including, but not limited to, those previously discussed above. The present invention is an automated business card locator. It consists of two components: 1) a software program that creates an index making the cards easy to locate, and 2) a loose-leaf binder with clear plastic business card-holder sheets. The binder also holds clear plastic sheet protectors 9 which retain the index sheets.

INDEX

The software program handles three pieces of information: 1) the name of the person or company on the business card, 2) the category that you as the user assign to the card, and 3) the page number where the card is located in the binder. The concept of the index is that it is used to locate the business cards quickly and easily, as the card is the data carrier. Business cards have a wealth of information on them, such as, but not limited to, name of the person, position of the person, name of the company, description of what the company does, address information, business phone number, home phone number, fax number, pager number, mobile number, picture of the person, company logo, e-mail address, web page addresses, etc. The program is designed so that the user can sort and print the index alphabetically by either name or category, whichever is more convenient for the individual to relate.

EXAMPLE

Suppose you were looking for a Real Estate Agent's card in order to give that person a call or a page. If your index were sorted by category, you would alphabetically move down the index in the category column to the R's and find the category "Real Estate" to locate the name of the agent you were looking for. If there were several agents listed, they would be in alphabetic order by name. Located next to the agent's name is the page number where their card is located; you would then flip over to the page in the binder where the card is located and use the information on the card to make a phone call, page them, etc.

When the software comes up the first time, the user is given a screen to enter the three pieces of information for each card needed to create the index, i.e., the name, page number and the category you assign to each card. Instructions tell the user to insert those business cards used most often, the ones that will be kept the longest, at the top of each page, and to write the page number on the top right-hand corner (right page) or top left-hand corner (left page) of each top card prior to slipping the business card in the slot. Each 3-card page has a single page number. The remaining cards can be loaded at random in the cardholder until all of the business cards are in the business card holder. The user is then instructed to input card information into the software, sort the list either by name or category, print out the index, trim and slide the indices into the sheet protector(s) in the front of the binder. The present invention is now ready to be used.

BRIEF DESCRIPTION OF THE DRAWINGS

FIG. 1 illustrates an opened business card binder with printed index and card holder.

FIG. 2 illustrates a software data entry template.

FIG. 3 illustrates a printed index (A–C) by category.

FIG. 4 illustrates a printed index (A–C) by name.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates an opened business card holder including outer shell 1, typically made of vinyl, leather or cloth. The shell usually comprises a support material such as high density cardboard or other equivalent material. The outer shell typically comprises two identical sections which may be joined by various binding techniques such as the multiple ring 3 embodiment shown in FIG. 1. The exact structure of the shell and binder sections is not essential to the present invention and may be found commercially in many forms, materials and sizes. The essential requirements are that it can hold a number of business cards in a multiple page format and preferredly, but not limited to, be portable, e.g. handheld.

In the preferred embodiment, the business card holder is approximately 6 inches wide, 8 inches high and has six 1¼ inch diameter rings with boosters. Boosters are the little metal ears located at the top and bottom of the business card holder that you press down on to open the rings. It will comfortably hold 200 business cards.

Further illustrated in FIG. 1, clear plastic card holding sheets 4 and three random business cards inserted therein. The business card holder retains multiple pages (not shown), each page capable of holding multiple cards in random order.

FIG. 2 illustrates a software template for entering the required information to the index program. The template requires the entry of the name, page number of placement and category of each business card retained within the business card holder. The software comprises a program written in Clarion Professional Developer for Windows 3.x/95™, but may be written in a variety of selected software development products commercially available in the art. The basic principles used in programming a tabular sorting routine are deemed to be well known and within the skill of one knowledgeable in the art of programming. The required information is then indexed and sorted by the program by name, category or page number. The template can be expanded to include additional categories if desired. In this embodiment, a particular business card could be located by two or more categories. By example, a business card for a carpet company would be categorized under carpet. If that same company also installed wallpaper or draperies, this information could be entered. When the indexing program sorts the categories, this business card could show up a multitude of times, depending on the number of categories chosen.

FIG. 3 illustrates a resulting printout of the index of various business cards entered into the indexing software through the template shown in FIG. 2. The printout includes three columns of information. Column 1 displays the business card name 6. Column 2 displays the actual page number location of each particular card 7. Column 3 displays the various categories and their correspondence with other cards in the same category. Please note that column three is sorted alphabetically for easy review.

FIG. 4 illustrates a resulting printout of the index of various business cards entered into the indexing software through the template shown in FIG. 2. The printout includes three columns of information. Column 1 displays the business card name 6. Column 2 displays the actual page number location of each particular card 7. Column 3 displays the various categories and their correspondence with other cards in the same category. In this printout, the business cards have been sorted by name (in alphabetical order).

In practice, the user will use the indexing software to organize the various business cards by category, page number or name. The user enters any new card information, by the template illustrated in FIG. 2, chooses the column to sort by, prints the resulting organized table 2 and inserts the printed table into the business card holder sheet protector 9 as shown in FIG. 1. Multiple sorted indexes, not shown, could be printed and placed into the business card holder sheet protector. For example, the user could keep both a table sorted by name and a table sorted by category in the same sheet protector, for purposes of cross reference. The paper for printing the tables can vary in size and/or style, be pre-sized, perforated paper or cut to fit.

CONCLUSION

A system and method has been shown in the above embodiments for the effective implementation of an organized business card holder. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by size, materials, connection methods, print styles, index paper or paper sizes, categories or software versions/environments or developer programs (i.e., Windows 95™, MAC™, etc.).

I claim:

1. A business card organizer comprising:
    a business card holder,
    said business card holder comprising:
        a binder,
        a plurality of card receiving pages,
    said card receiving pages each including a plurality of business card receiving sections,
    a computer generated indexing system, and
    wherein said plurality of card receiving pages are sequentially numbered, one or more of said business cards are retained randomly within said plurality of business card receiving sections and said computer generated indexing system identifies each card's page location based on a chosen index parameter.

2. A business card organizer as per claim 1, wherein said computer generated indexing system comprises a business card data entry template.

3. A business card organizer as per claim 1, wherein said business card holder contains at least one index sheet protector.

4. A business card organizer as per claim 2, wherein said computer generated indexing system comprises business card data entries sorted by category.

5. A business card organizer as per claim 2, wherein said computer generated indexing system comprises business card data entries sorted by name.

6. A business card organizer as per claim 2, wherein said computer generated indexing system comprises business card data entries sorted by page number.

7. A business card organizer as per claim 2, wherein said computer generated indexing system comprises business card data entries sorted by category, name or page number.

8. A business card organizer as per claim 2, wherein said template comprises data entry of at least a business card name, card location and one or more categories.

9. A method of locating business cards placed randomly within pages contained within a business card holder comprising:
    entering business card information into a computer generated template, said business card information including indices of at least name, category and page number of said business card holder;
    selecting a computer generated sort of said entered business card information based on one or more of said indices;
    printing a computer generated printout of said sorted card information;
    retaining said computer generated printout within a designated index section of said business card holder, and
    wherein said business cards are located by traversal of said computer generated printout to locate a desired name or category and its corresponding page number.

10. A method of locating business cards as per claim 9, wherein said computer generated template comprises data entry of at least a business card name, card location and one or more categories.

* * * * *